Sept. 13, 1955  J. L. HARRIS ET AL  2,717,455
DRIER CONTROL SYSTEM
Filed March 9, 1949

INVENTORS
WAYLAND R. MILLER
JOHN L. HARRIS
BY John L. Harris
ATTORNEY

United States Patent Office 2,717,455
Patented Sept. 13, 1955

2,717,455

DRIER CONTROL SYSTEM

John L. Harris and Wayland R. Miller,
Whitefish Bay, Wis.

Application March 9, 1949, Serial No. 80,414

7 Claims. (Cl. 34—45)

This invention relates to driers and more particularly to automatic controls for clothes driers.

These driers usually consist of a motor driven tumbler in which the clothes are placed and are tumbled during the drying period. While the clothes are being tumbled, air is circulated through the tumbler and also heat is applied, either as radiant heat from an electric heater or as converted heat from steam coils or a gas burner. If heat is applied to the drier and load at a substantially constant or definite rate, for a given load, the temperature rise within the drier takes a definite pattern. That is, there is a definite relationship between temperature and percentage of moisture in the clothing. Thus, if the drier is controlled by a thermostat either in the drier casing or responsive to discharge air, the thermostat can be set to stop the drier with any desired percentage of moisture in the clothes, either completely dry, or slightly damp for ironing. However, different loads have different percentage of moisture to temperature characteristics. For example, with a full drier load, the heat absorbing capacity of the load is high, which causes a slow temperature rise within the drier. With a light load, the heat absorbing capacity of the load is low and the temperature within the drier rises rapidly, at a rate which is out of proportion to the drying rate as compared with a full load. Thus, for a light load, to obtain a given percentage of moisture in the load at the end of the drying cycle, it is necessary to set the thermostat to a substantially higher cut off point than for a full load.

One object of the present invention is to provide a drier control system in which a single setting of the thermostat will cause the clothes to come out at substantially the same percentage of moisture, regardless of whether the drier operates with a full load or a partial load. This object is accomplished in part by the provision of a control system employing both a thermostat and a timer. The thermostat responds to the drier temperature at a point where temperaure varies with the dryness of the clothes and serves to cut off the heat when the temperature of the thermostat reaches a certain value. The timer then functions to keep the tumbler in operation for an accurately fixed period of time after the heat is cut off. By operating the tumbler for this accurately fixed period of time after the heat is cut off, a fixed additional amount of drying is done before the drier stops, this drying action being provided by the residual heat in the drier. When a full load is run in the drier, the clothes are at substantially the percentage of moisture desired when the thermostat cuts off the heater. The additional amount of drying provided by the timed cooling period must be spread over the full load and thus the percentage of moisture removed during the timed period is relatively low, which is as it should be for good results. However, when the drier is run with a light load at the same thermostat setting, the thermostat will cut off the heater with a substantially larger percentage of moisture than for the full load. However, the fixed amount of drying action provided by the accurately timed period when applied to the light load removes a considerably higher percentage of moisture than it does for a full load. Thus, with a light load, the thermostat cuts off the heater at a higher percentage of moisture than for a full load, but this action is compensated for by the fixed amount of additional drying which removes a greater percentage of moisture from the light load than it does from the full load. By making the cooling period of sufficient length very uniform results can be obtained with a single thermostat setting, regardless of load.

We have discovered that by proper correlating the characteristics of the thermostat to the characteristics of the drier and control system, uniform drying results can be obtained with a relatively short cooling period of approximately five minutes. This duration of cooling period is insufficient to provide complete load compensation by itself, as the temperature cut-off point for a given degree of dryness is higher for light loads than for heavy loads. However, by using a thermostat having a very slow response rate, the thermostat for a given setting will cut off at the higher temperature required for light loads and also at the lower temperature required for full loads. This is due to the fact that at light loads, the temperature rise within the drier is rapid and with heavy loads the temperature rise is relatively slow. With a full load, the thermostat follows the slow temperature change fairly closely and the actual cut-off point of the thermostat is close to the mechanical setting of the thermostat. However, with a light load and fast temperature rise, the thermostat temperature lags behind the actual temperature in the drier and the drier temperature at which the thermostat operates is substantially above the mechanical setting of the the thermostat. By properly selecting the characteristics of the thermostat used, very good load compensation is obtained. That is, a single setting of the thermostat will provide a fixed percentage of moisture within acceptable limits.

A further object of the invention is to provide a drier control system employing a thermostatic cut-off in which the drier can be immediately restarted and go through a new cycle regardless of the temperature at the thermostat.

Another object of the invention is to provide an automatic drier control system which both cuts off the drier at the right time for the load and signals to the user that the drying cycle has been completed.

A further object of the invention is the provision of a drier control system in which a single control device serves to control the various components of the drier in the desired sequence and also provides for manual control of a light for the tumbler chamber.

Another object of the invention is the provision of a drier control system which controls the heat and tumbling action in a predetermined cycle and in which the operator can stop the drier at any time and restart it at any portion of the drying cycle.

A further object of the invention is the provision of a drier control system which controls the heat and tumbler in a predetermined sequence in response to conditions within the drier, and also indicates to the operator the portion of the cycle in which the drier is operating.

Other objects and advantages of the invention will appear from the following description and appended claims.

For a full disclosure of the invention reference is made to the following detailed description and to the accompanying drawings in which:

Fig. 3 is a fragmentary perspective view of one form of the drier to which the invention is applicable; and in which

Figure 3:
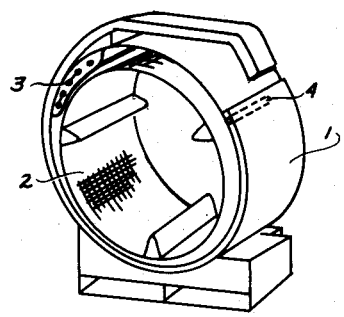

Referring first to Fig. 3, reference character 1 indicates a drier housing in which is located a rotatable drum or tumbler 2. This tumbler is driven by a motor (not shown) but in a manner well known in the drier art. In the upper left hand portion of the casing is located an electric heater 3. This heater is controlled by a thermostat having a bulb 4 located preferably in a space between the tumbler and drier housing. This thermostat may be of the liquid filled type in which an expansible liquid in the bulb communicates with a diaphragm or bellows operating a switch. Thermostats of this type are well known in the art. It will be understood that the drier shown in Fig. 3 includes additional components such as a motor driven fan for circulating air through the tumbler chamber. This drier may also be provided with a flood light for lighting the inside of the drier and germicidal lamp for killing any germs in the articles being dried. For further details on the drier construction in Fig. 3 reference is made to Patent No. 2,385,223, issued to James R. Moore on September 18, 1945.

Figure 1:
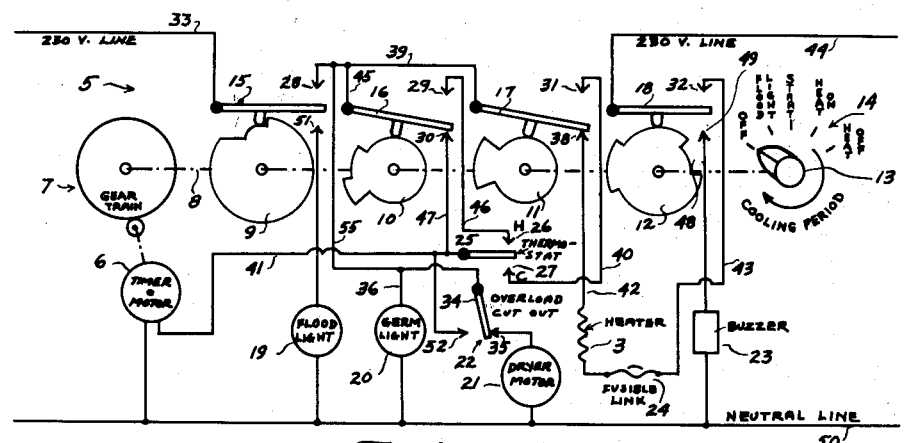
Fig. 1 is a schematic wiring diagram showing one form of the invention.

Referring to Fig. 1, reference character 5 indicates generally a motor driven timing mechanism having a timer motor 6 driving a gear train 7 which revolves a cam shaft 8 supporting a series of cams 9, 10, 11 and 12. The shaft 8 is also provided with a manual knob 13 which indicates the position of the cam shaft on a dial generally indicated as 14. The cams 9, 10, 11 and 12 operate switch arms 15, 16, 17 and 18 respectively, these switching arms cooperating with stationary contacts as shown. It will be apparent that as the cam shaft is rotated either by the manual knob or the timer motor 6, the switch arms will be operated into various contact positions as determined by the configuration of the operating cams. The drier also includes a flood light 19, a germicidal lamp 20, a motor 21, an overload cut-out 22, a heater 3, a buzzer 23 and a fusible link 24. It will be understood that the drier motor 21 revolves the tumbler 2 and also may operate a fan which forces air through the drier. The fusible link 24 is located adjacent the heater 3 in the drier and serves to melt and break the heater circuit if the temperature within the drier becomes dangerous. The drier control system also includes a thermostatic switch shown diagrammatically as including a switch arm 25 cooperating with a "hot" contact 26 and a "cold" contact 27. The switch arm 25 is operated by means well known in the art in response to temperature changes of the bulb 4. This thermostat serves to cause arm 25 to engage contact 27 when the temperature in the drier is below a predetermined value and to engage contact 26 when the temperature is above a predetermined value. The thermostat is provided with a suitable adjusting means which may be operated by the user. This thermostat, as will become apparent from the following description, serves to determine the degree of dryness automatically provided by the drier control system.

*Operation of Figure 1*

In operating the drier, the user first places the clothes to be dried in the tumbler chamber and moves the knob on the timer from "off" to "start." This position of the cam shaft causes switch arm 15 to engage stationary contact 28, switch arm 16 to be midway between stationary contacts 29 and 30, switch arm 17 to engage contact 31 and the switch arm 18 to engage contact 32. Engagement of switch arm 15 with contact 28 completes a circuit from the line wire 33 through switch arm 15 and contact 28, wire 55, overload cut-out switch arm 34, and contact 35 to the drier motor 21. A parallel circuit is also established from wire 55 through wire 36 to the germicidal light 20. The drier motor is therefore placed into operation, thus causing the tumbler to revolve and also operating a fan for causing air to pass through the drier. At this time the heater circuit is broken due to switch arm 17 being disengaged from the heater contact 38. Due to the switch arm 16 being disengaged from both contacts 29 and 30 the only circuit that can be established to the timing motor is through the "cold" contact 27 of the thermostat. If this thermostat is in its "cold" position, the switch arm 25 engages contact 27 and establishes a circuit to the timer motor as follows: line wire 33, switch arm 15, contact 28, wire 39, switch arm 17, contact 31, wire 40, thermostat contact 27, switch arm 25 and wire 41 to the timer motor 6. The timer motor is therefore energized and drives the cam shaft in a clockwise direction. This rotation of the cams causes the switch arm 16 to engage contact 29 and also causes the switch arm 17 to disengage contact 31 and engage contact 38. The initial circuit for the timer motor was through contacts 17 and 31. Thus when these contacts break, the timer motor is de-energized and the cam shaft thus remains stationary in the position marked "heat on" on the dial. In this position of the cam shaft a circuit for the heater is established as follows: line wire 33, switch arm 15, contact 28, wire 39, switch arm 17, contact 38, wire 42, heater 3, fusible link 24, wire 43, contact 32 and switch arm 18 to the 230 volt line wire 44.

The drier is now in complete operation, the motor being energized to revolve the tumbler and supply air and the heater being energized to supply heat for accelerating the drying action. In the initial portion of the drying cycle the evaporation of moisture from the clothes uses a considerable portion of the heat input and the temperature rise is slow. However, as the clothes become dry the temperature within the drier begins to rise rapidly. When the temperature rises to the setting of the thermostat, the switch arm 25 engages contact 26. This establishes a new circuit to the timer motor as follows: line wire 33, switch arm 15, contact 28, wire 45, switch arm 16, contact 29, wire 46, contact 26, switch arm 25, and wire 41 to the timer motor. The timer motor now drives the cam shaft clockwise to the position marked "Heat off" on the dial. At this time the switch arm 18 drops from contact 32 to the midposition shown. This action de-energizes the heater 3. Also at the "heat off" position the switch arm 16 disengages contact 29 and engages contact 30. This establishes a new circuit to the timer motor which is independent of the position of the thermostat. This new circuit is as follows: line wire 33, switch arm 15, contact 28, wire 45, switch arm 16, contact 30, wire 47 and wire 41 to the timer motor 6. The heat is therefore "off" and the timer motor is energized independently of the thermostat. The cam shaft now continues to run through its cycle toward the "off" position on the dial. Slightly before the cam shaft reaches its "off" position, the switch arm 18 drops into a notch 48 in the cam 12 causing it to engage the contact 49. This establishes a circuit to the buzzer 23 as follows: line wire 44, switch arm 18, contact 49 and buzzer 23 to the neutral line 50. This indicates to the user that the drier is at the end of its operating cycle. Shortly before the cam shaft reaches the "off" position the switch arm 18 rides out of the notch 48 in cam 12 causing it to assume the neutral position shown in which the buzzer is de-energized. When the cam shaft reaches the "off" position, the switch arm 15 drops from contact 28 to the neutral position shown. Opening of these contacts breaks the circuit to the drier motor 21, the germicidal light 20 and the timer motor 6. The drier, therefore, is placed out of operation and the timer motor 6 is de-energized with the cam shaft positioned as shown.

The user, in order to turn on the flood light, simply moves the knob 13 from "off" to the position marked "Flood light" on the dial. This motion of the cam shaft does not affect the position of the switch arms 16, 17 and 18 but causes the switch arm 15 to engage contact 51. This establishes a direct circuit to the flood light. When the operator is through with the flood light, the knob 13 is moved from the "flood light" position on the dial back to the "off" position.

In the event that the drier motor should fail in some manner when the timer is in the "heat on" position, the tumbler and air supply means would fail to operate while the heater would be permitted to continue operation. This involves danger of scorching the clothes before the temperature at the thermostat rises sufficiently to cause the timer to turn the heater off. To protect against this occurring, the overload cut-out 22 is provided with a contact 52 which is engaged by the switch arm 34 when the overload cut-out de-energizes the motor 21. This establishes a direct circuit to the timer motor as follows: line wire 33, switch arm 15, contact 28, wire 55, switch arm 34, contact 52 and wire 41 to the timer motor. This drives the cam shaft through its cycle to cut off the heat and open contacts 15, 28 to de-energize the complete system.

Summarizing the operation of Fig. 1, when the operating knob is turned to the "start" position it energizes the drier motor and germicidal light. In the "start" position the timer motor remains at de-energized until the thermostat calls for heat. When this occurs, the timer motor is energized and drives the cam shaft to the "heat-on" position at which time the heater is energized and the timer motor is de-energized. The timer thus remains stationary at the "heat-on" position until the thermostat reaches its "hot" position, which serves to re-energize the timer motor and cause it to turn off the heater. At this time the timer completes a circuit to the timer motor which is independent of the thermostat and the timer operates for a period of approximately 5 minutes before reaching the "off" position at which time everything becomes de-energized. Just before the timer reaches the "off" position it energizes the buzzer to indicate that the drying has been completed. The cooling period provided by the timer between the time the heater is de-energized and the time that the drier stops provides for using the residual heat in the drier for completing the drying process. This also serves to cool down the clothes before removal from the drier.

Figure 2:
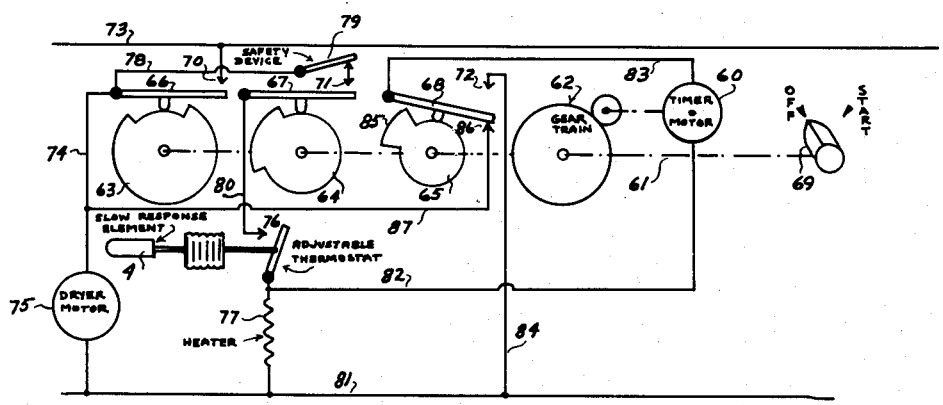
Fig. 2 is a schematic wiring diagram of a modified form of the invention.

*Figure 2*

Referring to Fig. 2, this figure shows a simplified method of accomplishing the same results as the arrangement shown in Fig. 1. However, in this arrangement the thermostat must carry the heavy heater current instead of the light timer motor current as in Fig. 1. The timer motor 60 drives a cam shaft 61 through a gear train 62. This cam shaft operates cams 63, 64 and 65 which in turn operate switch arms 66, 67 and 68 respectively. With the parts in the positions shown, the timer is in the "off" position. When the drier is placed into operation, the operator moves the timer knob 69 from the "off" position to the "start" position. This causes the switch arms 66, 67 and 68 to engage contacts 70, 71 and 72 respectively. Engagement of the switch arm 66 with the contact 70 completes a circuit from the line wire 73 through contact 70, switch arm 66 and wire 74 to the drier motor 75. If the thermostat contacts 76 are closed, the heater 77 is energized as follows: line wire 73, contact 70, switch arm 66, wire 78, safety device 79, contacts 71, switch arm 67, wire 80, thermostat contacts 76 and heater 77 to line wire 81. However, if the thermostat is in its "hot" position, the contacts 76 are open and the heater 77 is not energized. The timer motor is also not energized and the timer remains in the "start" position until the drier cools down for causing the thermostat contacts 76 to engage. When this occurs it energizes the heater 77 as previously described. Also, the thermostat contacts 76 establish an initial circuit for the timer motor as follows: line wire 73, contact 70, switch arm 66, wire 78, safety device 79, contact 71, switch arm 67, wire 80, thermostat contacts 76, wire 82, timer motor 60, wire 83, switch arm 68, contact 72, and wires 84 to line wire 81. The timer now runs to a position at which the switch arm 68 drops off the lobe 85 of cam 65 causing the switch arm 68 to disengage contact 72 and engage contact 86. In this position, the switch arms 66 and 67 remain engaged with contacts 70 and 71 respectively. Due to the switch arm 68 disengaging contact 72, the timer motor stops in this intermediate position. The drier now operates until the temperature at the thermostat rises sufficiently to cause the thermostat contacts to open. When these contacts open a circuit is established through the timer motor as follows: line wire 73, contact 70, switch arm 66, wire 74, wire 87, contact 86, switch arm 68, wire 83, timer motor 60, wire 82 and heater 77 to line wire 81. It should be noted that when the thermostat contacts 76 are closed with the switch arm 68 engaging contact 86, the timer motor is shunted out by the thermostat contacts 76 and thus the timer motor cannot operate until contacts 76 open. In this embodiment of the invention the timer motor operates in series with the heater 77. However, the resistance of the heater 77 is negligible compared with the impedance of the timer motor 60 and the timer motor will operate with substantially full voltage in series with the heater. The timer motor now operates and first breaks the engagement of the switch arm 67 with contact 71. This prevents the thermostat from again turning on the heater from a temperature drop caused by the heater being de-energized. The timer now runs for a period of approximately 5 minutes to the "off" position at which time switch arm 66 disengages contact 70 to de-energize both the drier motor and timer motor. The safety device 79 is preferably located near the heater and is set to open its contacts in the event that the temperature in the drier rises to an unsafe value. Thus, if the tumbler and air supply fail to operate, the safety device 79 will open its contacts and break the circuit to the heater 77. This safety device may be a fusible link such as 24 in Fig. 1 or a manual reset thermostat.

From the foregoing description of Fig. 2 it will be apparent that the operation is similar to that of Fig. 1. In other words, setting of the timer to the "start" position places the drier motor in operation and the timer will remain stationary until the thermostat calls for heat. When the thermostat calls for heat the timer moves to an intermediate position where both motor and heater are energized. The timer now remains in this position until the thermostat becomes satisfied at which time it operates a switch placing the thermostat out of control of both the heater and timer motor. The timer then operates for a period of approximately 5 minutes and places the drier motor out of operation.

It will be noted that in both Fig. 1 and Fig. 2 the control system prevents operation of the timer motor when the drier is started until the thermostat calls for heat. This is an important feature as it permits the drier to be restarted immediately after a run and go through a new cycle. Without this provision the timer would act to turn off the heat and go through the cooling cycle if the drier were started while the thermostat was still in the "hot" position. The provision of preventing the timer motor from starting until the thermostat calls for heat thus provides for faster use of the drier and also makes the system completely foolproof.

It will also be noted that both systems of control provide an accurately timed cooling period between the time that the heater is de-energized and the drier is placed out of operation. This is an important feature of the invention as it provides for obtaining very uniform results with like drier loads and also contributes to obtaining of uniform results with both heavy and light loads in the drier. With the present system of control, the thermostat is set so that it terminates operation of the heater before the clothes are completely dry. The residual heat in the drier, together with the tumbling action and air supply continues the drying action during the cooling period. If the duration of this cooling period is not fixed accurately the amount of drying provided by this period is a variable and will cause the clothes to come out either too damp or too dry.

In addition, the accurately timed cooling period serves to partly compensate for differences between light loads and heavy loads. If the load in the drier is light the heat absorbing capacity of the load is relatively low and thus the drier temperature will rise rapidly to the cut-off point of the thermostat. This rise in temperature is actually faster than the drying of the clothes. However, with the accurately timed cooling period, the residual heat in the drier under operation for the predetermined period of time will provide a large percentage of the drying action. With a heavy load the heat absorbing capacity of the load prevents the temperature from rising rapidly and a large portion of the drying action occurs before the heater is turned off. The cooling period provides additional drying but this drying is distributed among the heavy load so that the actual percentage of moisture withdrawn during the cooling period is comparatively small. Summarizing the provision of a substantially fixed amount of drying after the heater is cut off has a compensating effect between light and heavy loads. Thus, light loads tend to cut off too soon but the drying action provided by the timed cooling period is substantial and tends to cause the clothes to come out at the same percentage of moisture as for heavy loads.

Figure 4:
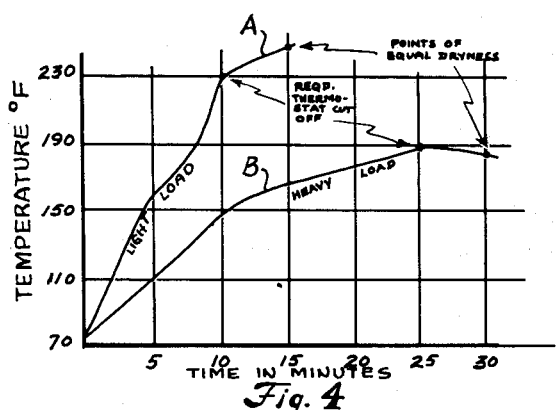
Fig. 4 shows typical performance curves of a drier operated in accordance with the principles of the invention.

While it is possible to provide good compensation by a prolonged cooling period, it is preferable to shorten the cooling period and provide the additional compensation required by employing a thermostatic element having a slow temperature response characteristic. Referring to Fig. 4, curve A indicates a typical time temperature curve for a light load and curve B indicates the time temperature characteristic for a heavy load. When full compensation is not obtained by the fixed cooling period, the temperature cut-off point for a light load will be higher than the cut-off point for a full load. With the light load the temperature rise is rapid and in 10 minutes the temperature within the drier rises to approximately 230°. If the load is such that it requires 10 minutes of heat to dry the load the temperature cut-off point for the load thus must be 230°. With a heavy load the temperature rise is considerably slower and thus the drier may operate 25 minutes before the temperature rise to 190°. Thus, if the time required to dry the heavy load is 25 minutes of heat the thermostat cut-off point is 190°. In comparing curves A and B, it will be observed that the rate of temperature rise of curve A adjacent the cut-off point is much greater than the rate of temperature rise of curve B. With the slow response thermal element the temperature of the element will follow a slow rising temperature fairly closely. Thus to obtain an actual cut-off point of 190° the thermostat setting would be only slightly above this point. However, where the rate of temperature rise is rapid, the slow response thermostat element will lag far behind the actual temperature. Thus, by making the thermal element slow enough in response, it will lag far enough behind the actual drier temperature to give the required temperature cut-off point with the thermostat setting considerably below this point. The combination of the fixed timing period and the slow response thermal element thus serves to provide for complete compensation for differences in loads in the drier. In other words, substantially the same thermostat setting will provide for equal degrees of dryness regardless of whether the load in the drier is heavy or light.

It should be noted that in both embodiments of the invention, the operator can stop the drier at any time simply by turning the knob to "off." It should also be noted that the drier can be restarted at any time by turning the knob to "start." Also, the drier may be started in any portion of the drying cycle desired.

In addition to providing automatic control of the drier the system disclosed also indicates to the operator just what is going on in the drier.

It will be apparent that the invention is not limited to the particular location of the thermostat. It is necessary only that the thermostat be located so as to respond to a temperature which is indicative of the degree of dryness of the clothes in the drier.

While we have shown and described preferred embodiments of the invention it will be apparent that many changes may be made by those skilled in the art without departing from the spirit and scope of the invention. While the invention has been described as applied to electric type driers it will be apparent that it is also applicable to gas fired or steam heated driers. For such applications it is necessary only to connect the heat control means into the circuit at the same location as the electric heater shown.

It is desired to be limited only by the scope of the appended claims.

What is claimed is:

1. In a control system for a tumbler type drier having tumbling means and heating means, the combination of, manual means for placing the tumbling means into operation, thermostatic means arranged so that the temperature to which it responds varies with the moisture release by the drier load, said thermostatic means having a "hot" position and a "cold" position, said thermostatic means being arranged to prevent operation of the heating means when the thermostat means is in its "hot" position while permitting operation of the heating means when the thermostatic means is in its "cold" position, timing means arranged to provide an accurately timed period, means controlled conjointly by the timing means and the thermostatic means for preventing operation of the timing means to time said period until the thermostatic means first reaches its "cold" position to permit operation of the heating means and then reaches its "hot" position to prevent operation thereof, and means actuated by said timing means at the end of said timed period for stopping said tumbling means.

2. In a control system for a tumbler type drier having tumbling means and heating means, the combination of, thermostatic means arranged so that the temperature to which it responds varies with the rate of moisture release by the drier load, timing means arranged to control the tumbling means and heating means, said timing means including a timing motor, a first switch for controlling the heating means and a second switch for controlling the tumbling means, said first switch being opened a predetermined time before said second switch, means for setting said timing means to start the drier, means for preventing operation of the timing motor to close said switches until said thermostatic means calls for heat, and means for causing operation of the timing motor to open said switches when the thermostatic means reaches a predetermined temperature.

3. In a control system for a tumbler type drier having tumbling means and heating means, the combination of, thermostatic means arranged so that the temperature to which it responds varies with the rate of moisture release by the drier load, timing means arranged to control the tumbling means and heating means, said timing means including a timing motor, a first switch for controlling the heating means and a second switch for controlling the tumbling means, said first switch being opened a predetermined time before said second switch, means for setting said timing means to start the drier, means for preventing operation of the timing motor to close said switches until said thermostatic means calls for heat, and means for causing operation of the timing motor to open said switches when the thermostatic means reaches a predetermined temperature, said thermostatic means being arranged to respond slowly to rise in temperature so that for a single setting it provides a substantially higher cut off point on a rapid temperature rise occurring on light loads than for a slow temperature rise occurring on heavy loads, thereby compensating for differences of loads in the drier.

4. In a control system for a tumbler type drier having tumbling means and heating means, the combination of, thermostatic means arranged so that the temperature to which it responds varies with the rate of moisture release by the drier load, said thermostatic means having a "hot" position and a "cold" position, a motor driven switching mechanism arranged upon movement from a predetermined position to first energize the heating means, de-energize the heating means and stop the tumbling means, means for causing operation of the motor driven switching mechanism from said predetermined position when the thermostat reaches its "cold" position and for stopping said switching mechanism in the position energizing the heating means, and means for causing operation of said motor driven switching mechanism from said last mentioned position for de-energizing the heating means and stopping the tumbling means, in response to the thermostatic means assuming its "hot" position.

5. In a control system for a tumbler type drier having tumbling means and heating means, the combination of, thermostatic means arranged so that the temperature to which it responds varies with the rate of moisture release by the drier load, said thermostatic means having a "hot" position and a "cold" position, a motor driven switching mechanism, said switching mechanism having a "start" position energizing the tumbling means, a "heat on" position energizing the heating means, a "heat-off" position de-energizing the heating means, and an "off" position de-energizing the tumbling means, and circuit connections between the switching mechanism and the thermostatic means, said circuit connections being arranged to cause movement of the switching mechanism from its "start" position to its "heat on" position in response to the thermostatic means assuming its "cold" position and to cause movement of said switching mechanism through its "heat off" position to its "off" position in response to the thermostatic means assuming its "hot" position.

6. In a control system for a tumbler type drier having tumbling means and heating means, the combination of, a signal, thermostatic means arranged so that the temperature to which it responds varies with the rate of moisture release by the drier load, timing means arranged to control the tumbling means and heating means, said timing means including a timing motor, a first switch for controlling the heating means, a second switch for controlling the tumbling means and a third switch for controlling said signal, said first switch being opened a predetermined time before operation of the second and third switches, means for setting the timing means to start the drier, means for preventing operation of the timing motor to operate said switches until said thermostatic means calls for heat, and means for causing operation of the timing motor to operate said switches when the thermostatic means reaches a predetermined temperature.

7. In a control system for a tumbler type drier having tumbling means, a motor for driving the same, and heating means, the combination of, thermostatic means arranged so that the temperature to which it responds varies with the rate of moisture release by the drier load, timing means arranged to control the motor and heating means, said timing means including a timing motor, a first switch for controlling the heating means and a second switch for controlling the motor for the tumbling means, said first switch being opened a predetermined time before said second switch, means for setting said timing means to start the drier, means for causing operation of the timing motor to open said switches when the thermostatic means reaches a predetermined temperature and means responsive to failure of operation of the tumbling means motor arranged to cause operation of the timing motor independently of said thermostatic means.

References Cited in the file of this patent

UNITED STATES PATENTS

| | | |
|---|---|---|
| 1,675,160 | Carroll | June 26, 1928 |
| 1,786,191 | Carroll | Dec. 23, 1930 |
| 2,398,880 | Broglie | Apr. 23, 1946 |
| 2,445,516 | Dickey | July 20, 1948 |
| 2,463,934 | Allen | Mar. 8, 1949 |
| 2,470,043 | Monsarrat | May 10, 1949 |
| 2,486,315 | Morris | Oct. 25, 1949 |
| 2,505,041 | Gorsuch | Apr. 25, 1950 |
| 2,548,313 | Kauffman II | Apr. 10, 1951 |